Nov. 17, 1953 G. ELLIOTT 2,659,770

RINGING CONTROL CIRCUIT FOR TELEPHONE SYSTEMS

Filed Dec. 11, 1952 3 Sheets-Sheet 1

INVENTOR
GEORGE ELLIOTT

BY

ATTORNEY

Nov. 17, 1953 G. ELLIOTT 2,659,770

RINGING CONTROL CIRCUIT FOR TELEPHONE SYSTEMS

Filed Dec. 11, 1952 3 Sheets-Sheet 2

INVENTOR

GEORGE ELLIOTT

BY Francis E. Blake

ATTORNEY

RINGING CONTROL CIRCUIT FOR TELEPHONE SYSTEMS

Filed Dec. 11, 1952 3 Sheets-Sheet 3

INVENTOR.
GEORGE ELLIOTT
BY
Francis E. Blake
ATTORNEY

Patented Nov. 17, 1953 2,659,770

UNITED STATES PATENT OFFICE 2,659,770

RINGING CONTROL CIRCUIT FOR TELEPHONE SYSTEMS

George Elliott, Rochester, N. Y., assignor to Stromberg-Carlson Company, a corporation of New York Application December 11, 1952, Serial No. 325,428

16 Claims. (Cl. 179—17)

This invention relates to dial telephone systems, and more particularly to the control of the application of ringing current to a party line in a dial telephone system.

Dial telephone systems providing party line operation are well known. In some of such systems, calls to a particular party on a party line are identified by a characteristic ringing signal such as a coded signal in which the identifying code may be the number of rings in quick succession in a ringing cycle. In other systems, characteristic different frequency selective ringers are connected to the party line at each party station and a different frequency of ringing current is applied to the line in order to ring the desired called party. In order to determine and select the characteristic ringing signal, the connectors of some systems are provided with a directively stepped switch responsive to impulses of the last dialed party identifying digit. The disadvantage of such an arrangement is that a party on the line may not retain the same number in the event that he moves to a new location and is of necessity connected to a different party line. To enable a party to have the same number regardless of what party line is used, a so-called terminal per station party line connector has been used. In the terminal per station arrangement, the first and second stepped positions of the connector and the line terminals selected thereby determine the character of the ringing so that a party may be connected within the exchange by jumpers from the connector terminals to any party line, provided that the characteristic ringing for such party is different than the characteristic ringing for other parties on the party line.

Various arrangements for characterizing the ringing to different parties on a party line connected to a terminal per station connector have been devised. Considerations of importance are that the number of different ringing current frequencies to be used should be not excessive and preferably not more than five; that the frequency selective ringers should be bridged across the line for better line balance; and that code ringing, if used, should not make the ringing cycle excessively long and yet should provide a reasonable length of ringing interval.

It is therefore a principal object of the present invention to provide a dial telephone system having an improved terminal per station party line connector and ringing control circuit to enable the use of a plurality of frequency selective ringers to be bridged across the line, with at least two of the ringers responding to the same frequency of ringing current in order to reduce the number of required frequencies of ringing current, and with a one and two ring code being used to distinguish calls to the parties having the same frequency of ringing current.

In circuits of this type, the application of ringing current more than once to the conductors of a called line during the time period of the complete ringing cycle may result in a ringing cycle of excessive time length, or in a reduction of the length of time the ringing current is connected at each application. Neither the excessively long interval between the ringing current applications nor the shortening of each application of ringing current is desirable from a telephone user's standpoint.

It is a further object of my invention to decrease the said timing interval for the complete ringing cycle and also to increase the time of each ringing current application.

In practicing the invention, for party lines having bridged frequency selective ringers for each party on a party line, a pair of conductors is connected to a terminal per station connector and in a conventional system these conductors may be common to and connected similarly in parallel to a plurality of terminal per station connectors. A ringing generator circuit is arranged to connect a plurality of sources of different frequencies of ringing current to one of the pair of conductors individually in spaced time sequence during a single ringing cycle. The generator circuit is also arranged to connect the same plurality of sources of different frequencies of ringing current to the other conductor individually in spaced time sequence during a ringing cycle, but at a different time with respect to the connection of the same frequency of ringing current to the one conductor such that an interval of time equal to the desired interval between one and two code rings is provided between the connection of the same frequency of ringing current to first one and then the other conductor. A ringing application control circuit including one of the selectively connected terminals of the terminal per station connector is arranged to connect the one conductor of the pair of conductors or both the one and the other of the conductors to the directively selected and connected party line in timed relation to the connection of a predetermined frequency of ringing current to the pairs of conductors thus determining the frequency of ringing current and the coded number of ringing current applications to the party line for a ringing cycle in accordance with the particular group of terminals selected by the directive operation of the terminal per station connector.

Further objects, features and the attending advantages of the invention will be apparent with reference to the following specification and drawings in which:

Fig. 2 is placed to the right of Fig. 1;

Figure 1:
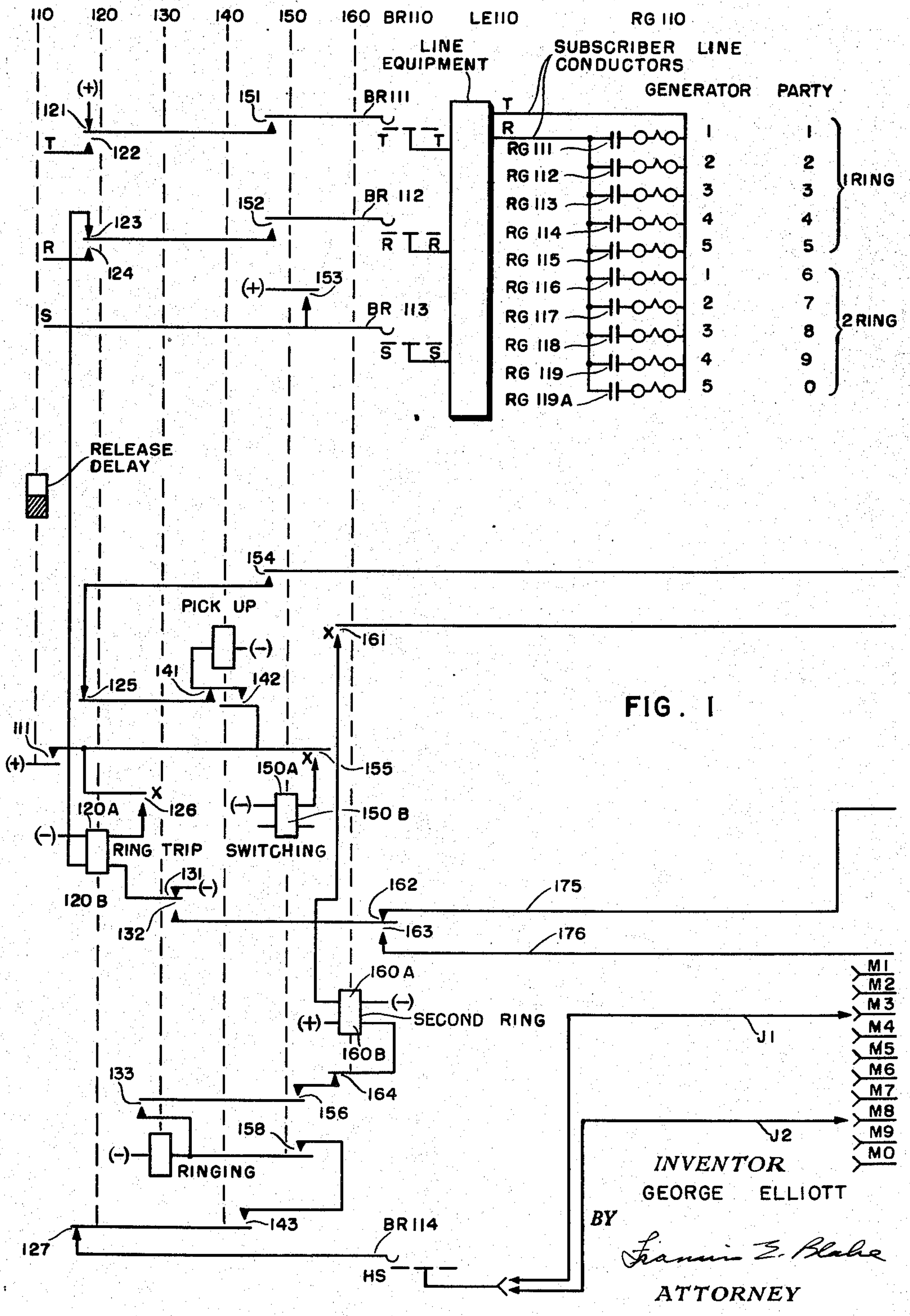
Fig. 1 is a partial schematic of a terminal per station party line connector having directively selected groups of terminals including tip, ring sleeve and hunt sleeve terminals.

Fig. 1 shows the essential portions of a terminal per station connector circuit embodying the invention. The remainder of the connector circuit (not shown) is entirely conventional and any similar connector switch circuit known in the art may be utilized. The frequency selective ringers generally shown at RG110 are also of any conventional type and are bridged across the party line in a manner to permit the audible operation of only two ringers for each application of ringing current from a particular generator characteristic frequency. Thus, generator 1 (shown in Fig. 2) will operate ringers RG111 and RG116 in unison, generator 1 providing for one ring of both ringers RG111 and RG116, or two rings of both ringers RG111 and RG116 depending upon the party to be rung on the party line as determined by the directively selected terminals of the connector in the manner to be described.

On a call from a local party or from an operator, the release delay relay 110 will be operated as is conventional and the connector switch will be directively operated to idle line equipment LE110, and the switching relay 150 will operate through its winding 150B in a manner well known in the art. Relay 150, upon operating, will complete a holding circuit for itself from ground (+) through operated contacts 111, preliminarily operated X contacts 155, and through winding 150A to battery (−). All contacts designated X in the drawings operate before other contacts of the same relay start to move. The line equipment designated LE110 includes connections whereby a plurality of different groups of connector bank terminals may be connected in parallel to the tip and ring conductors T and R of a party line to thus provide terminal per station party line operation as is well known.

Operation of the switching relay 150 closes ground through contacts 153 to the sleeve conductor brush BR113, and through bank contact S to the line equipment LE110, to prevent the connection of another similar call to the same line equipment, and to operate the cutoff relay in the line circuit to free the line conductors for the subsequent ringing and talking procedures. Operation of relay 150 also connects battery through normally closed contacts 131, winding 120B of ring trip relay 120, normally closed contacts 123, operated contacts 152, ring conductor brush BR112, bank contact R, to line conductor R. Line conductor T is connected through bank contact T, tip conductor brush BR111, operated contacts 151, and normally closed contacts 121 to ground. Ring-trip relay 120 does not operate at this time as the said ringers RG110 bridged across the line conductors T and R are an open direct current circuit due to the capacitors in each ringer circuit. If, however, any one of the ten parties should now remove the receiver or handset of the telephone instrument to thereby close the called line direct current circuit, the ringtrip relay 120 would operate over the circuit path previously described.

Figure 2:
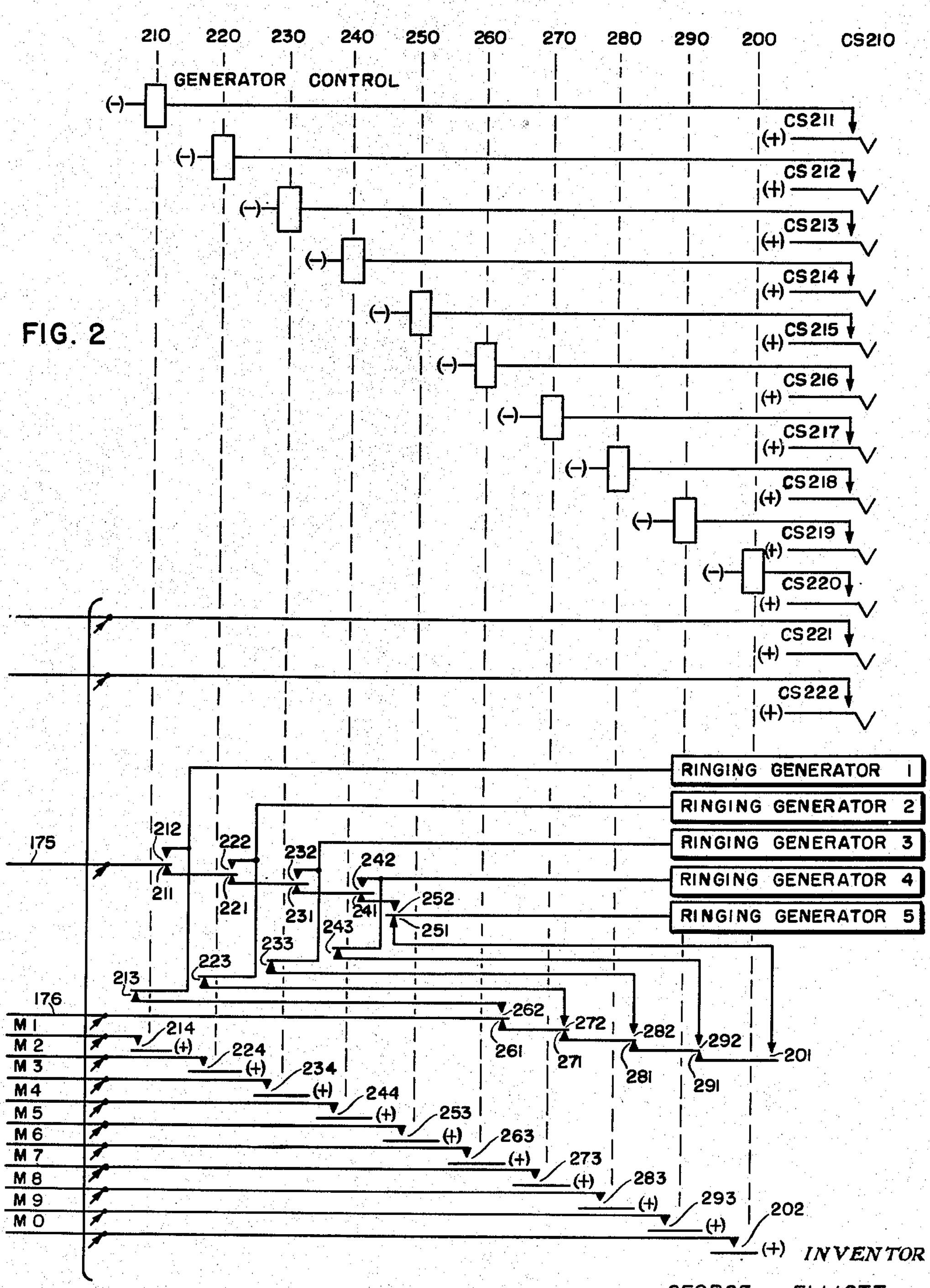
Fig. 2 is a schematic of a ringing generator circuit for common connection with one or more terminal per station connectors such as the one shown in Fig. 1 when
Figures 3, 4:
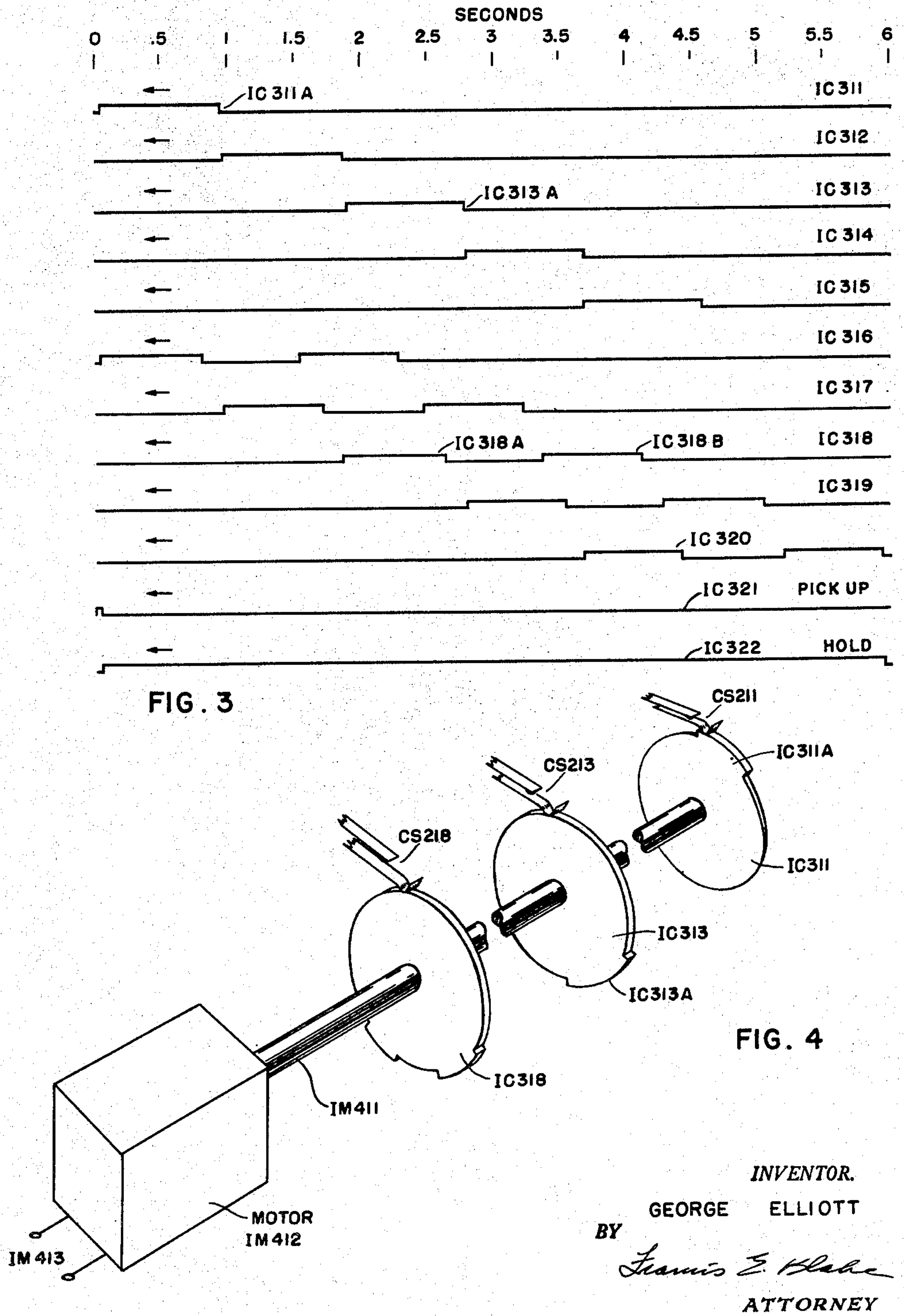
Fig. 3 is a timing chart showing the cam profiles of the interrupter cams controlling the closing of the cam spring contacts and therefore the operation of the ringing generator and control relays in Fig. 2 in a given ringing cycle of six seconds duration.
Fig. 4 is perspective detail showing the mechanical arrangement of interrupter cams.

The group of cam springs generally shown at CS210 in Fig. 2 are operated, at varying times, by respective ones of the interrupter cams, IC311–IC322, such as the one designated IC311 shown in detail in Fig. 4 and having the cam profile IC311A also shown in Fig. 3. These cams, one for each cam spring contact combination, are mounted on an interrupter shaft IM411 which is continuously rotated in a counterclockwise direction at a rate of one complete revolution every six seconds, or at another arbitrary rate as desired, by an interrupter motor IM412 energized from a suitable power source IM413. This interrupter machine and its components are entirely conventional and are well known to one skilled in the art. On each interrupter cam is a raised portion, such as shown at IC311A to be of an arbitrary length, which closes cam spring contacts CS211 correspondingly during each revolution of the said cam. In Fig. 3, the profile of each cam has been shown superimposed on a timing chart corresponding to one cycle of cam revolution in six seconds. The periodic closure of the various cam spring contacts CS211 through CS222 during the rotation of the interrupter cams energizes various relays correspondingly, to connect the various ringing generator sources, *Gen* 1 to *Gen* 5, to the called line, as will be subsequently described in detail. The pickup cam IC321 is shown as being presently in a position to operate cam spring contacts CS221 but the interrupter shaft will open these springs as it continues to rotate. Others of the cam springs CS211–CS222 will then be operated, as subsequently described.

It will be noted that the first ringing generator conductor 175 is connected successively to ringing current generators 1 to 5 during each ringing cycle of rotation of the cam shaft IM411 by the operation of relays 210–250 through their respective contacts 211, 212, 221, 222, 231, 232, 241, 242 and 252. Similarly the second ringing generator conductor 176 is connected successively to ringing current generators 1 to 5 by the serial operation of ringing relay 260–290 and 200 including contacts 261, 262, 271, 272, 281, 282, 291, 292, 201 together with normal contacts 213, 223, 233, 243, and 251 of relay 210–250 such that the connection of ringing generators 1 to 5 to conductor 176 is spaced in time during each ringing cycle with respect to the connection of similar ones of ringing generators 1–5 to conductor 175 by a time interval equal to the desired interval between code two rings. An example of this spacing may be shown by the time spacing between cam profiles IC313A and IC318B (Fig. 3).

Assuming that no party on the called line has previously answered, at the beginning of the ringing cycle, the pickup relay 140 is energized from ground through cam spring contacts CS221, operated contacts 154, normally closed contacts 125 and 141, and through winding of relay 140 to battery. Relay 140, upon operating, closes a holding circuit for itself through operated contacts 142 to the operating ground from operated contacts 111 of release delay relay 110. The interrupter cams IC311–IC322 will continue to move to in turn energize ringing generator and control relays 210 to 250 consecutively once during each full interrupter cycle, from ground through cam spring contacts CS211 to CS215, respectively. Ringing generator and control relays 260 to 290 and 200 will also be operated twice during each full interrupter cycle, from ground through cam spring contacts CS216 to CS220, respectively.

The hunt sleeve bank contact terminal HS of the connector is shown as being connected either by a typical marking jumper wiring J1 to provide for one ring by generator 3 in a ringing cycle, or by another typical marking jumper wiring J2 to provide for two rings by generator 3 in a ringing cycle. It will be obvious that only one jumper is connected from a given connector terminal to a predetermined one of the common leads M1 to M0 and that the M-lead to which the jumper is connected will determine which generator current and code that the connector will apply to the line. Thus the jumpers provide for the use of any other one or two ring generator current.

Assuming that the former marking jumper wiring J1 is used to provide for one ring by generator 3, ringing relay 130 will be energized once during the time that ringing generator control relay 230 is operated from cam spring contacts CS213 during each full revolution of the interrupter machine shaft IM411, from ground through operated contacts 234, jumper J1 connecting common terminal M3 to bank contact HS, hunt sleeve brush BR114, normally closed contacts 127, operated contacts 143 and 153, and through winding of ringing relay 130 to battery. Operation of relay 130 connects generator 3 through operated contacts 232, normally closed contacts 221, 211, over the first ringing generator conductor 175 to the connector circuit and normally closed contacts 162, operated contacts 132, through winding 120B, normally closed contacts 123 and through the ringers RG110 by the previously described circuit, and to ground through normally closed contacts 121. The ringers RG113 and RG118 at party telephones 3 and 8 which are responsive to ringing current having the frequency generated by generator 3 will now ring until ringing generator relay 230 is restored as the interrupter cam rotates to open the ground connection at cam spring contacts CS213. When the holding ground for ringing relay 130 is thusly opened, the second ring relay 160 is energized from battery through winding of ringing relay 130, operated contacts 133 and 156, normally closed contacts 164, and through winding 160B to ground. Operation of second ring relay 160 closes a holding ground for itself from ground through hold cam spring contacts CS222, preliminarily operated contacts 161 and through winding 160A to battery. Operation of second ring relay 160 opens the operating circuit from ringing relay 130 at contacts 164 thus allowing ringing relay 130 to restore. Relay 160 will remain operated until hold cam spring contacts CS222 are opened at the completion of each ringing cycle. As the marking lead J1 which was assumed to be connected to common lead M3 is not again connected to ground during this same ringing cycle, ringing relay 130 will not again operate and will have been operated but once in each ringing cycle to provide for the assumed code one ring by generator 3.

If, however, the HS bank contact terminal of the connector is connected by means of a jumper wiring J2 to common lead M8 instead of jumper wire J1 to common lead M3, two rings of generator 3 will be connected to the called line during each interrupter ringing cycle. Both ringing relay 130 and second ring relay 160 will operate as previously described for one ring application with relay 160 remaining operated and relay 130 restored except that the first operation of ringing relay 130 is controlled by cam springs CS218 and control relay 280 operated by cam profile IC318A. When ringing generator relay 280 is reoperated the second time as cam spring contacts CS218 close ground to it in response to cam profile IC318B, ringing relay 130 will reoperate to connect a second period of generator 3 to the called line, through normally closed contacts 233, operated contacts 282, normally closed contacts 271 and 261, the second ringing generator conductor 176 to the connector circuit, operated contacts 163 and 132, and to the called line by the previously described circuit path through the ringtrip relay 120. It will thus be noted that ringing generator 3 is connected to the second ringing generator conductor 176 while relay 280 is operated for the second time by contact springs CS218 at a time during the ringing cycle that is spaced from the time ringing generator 3 is connected to the first ringing generator conductor 175 during the operation of relay 230 by contact springs CS213. As previously described, the spaced time interval is determined to be the desired time interval between ringing current applications in a single ringing cycle for two code ringing and may be approximately one second as shown by the time spacing between cam profiles IC313A and IC318B, Fig. 3.

The application of either one or two generator ringing periods will continue until the calling party abandons the call or until the signaled party answers the call, either between or during the ringing periods, thereby operating the ringtrip relay 120 through its winding 120B and holding it through its winding 120A from ground through operated contacts 111 and 126, both in the well known manner. Operation of relay 120 opens the operate ground for ringing relay 130 at contacts 127 and also ground for the pickup relay 40 at contacts 125. Operation of the ringtrip relay 120 also connects the called and calling parties together at contacts 122 and 124 for transmission purposes in the well known manner.

When other ringing current frequencies for either one or two code ringing applications are to be connected to the party line for other parties as determined by the directive operation of the connector switch brushes BR111–BR114 to other connector bank terminals, another jumper similar to jumpers J1 or J2 will be connected from the selected HS bank terminal to the desired one of the common leads M1–M0 to provide the desired ringing current frequency and code rings. The operation of the various numbered contacts of relays 200–290 should be obvious from the previous detailed descriptions in connection with either jumpers J1 or J2 and will not be further described.

At the completion of the conversation, the calling party replaces the receiver or handset thereby causing release delay relay 110 to restore to open the holding ground at contacts 111, and to restore the connector switch in the well known manner, ready for a succeeding call.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. In a dial telephone system, a connector having a plurality of different groups of connector terminals to be directively selected in response to dial impulses, each of said groups of terminals including at least one talking conductor terminal, means to connect the talking conductor terminals of a plurality of different groups of connector terminals in parallel to a party line, a first conductor, a plurality of different frequency sources of ringing current, means connecting each of said plurality of different frequency sources of ringing current to said first conductor in time sequence within recurring ringing cycles, a second conductor, means connecting each of said plurality of different frequency sources of ringing current to said second conductor in time sequence within recurring ringing cycles, the connection of said frequency sources to said second conductor in a given recurring ringing cycle being differently timed with respect to the connection of said frequency sources to said first conductor in the same recurring ringing cycle to provide a time interval between the connection of similar frequency sources to said conductors equal to at least the minimum interval between ringing current applications to a called line in a given ringing cycle, and means including a terminal of the directively selected group of terminals of said connector for predetermining the connection of said first and second conductors to the directively selected talking conductor terminal in timed relation coincident with the connection of a predetermined one of said frequency sources to said first and second conductors whereby the frequency of ringing current and number of applications of ringing current in a given ringing cycle to a party line may be selectively determined by the directive operation of said connector.

2. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, means connecting each of said plurality of different frequency sources of ringing current to said first conductor in time sequence within recurring ringing cycles, a second conductor, means connecting each of said plurality of different frequency sources of ringing current to said second conductor in time sequence within recurring ringing cycles, the connection of said frequency sources to said second conductor in a given recurring ringing cycle being differently timed with respect to the connection of said frequency sources to said first conductor in the same recurring ringing cycle to provide a time interval between the connection of similar frequency sources to said conductors equal to at least the minimum interval between ringing current applications to a called line in a given ringing cycle, and means including one of the directively selected terminals of said connector for predetermining the connection of said first and second conductors to one of the directively selected talking conductor terminals in timed relation coincident with the connection of a predetermined one of said frequency sources to said first and second conductors whereby the frequency of ringing current and number of applications of ringing current in a given ringing cycle to a party line may be selectively determined by the directive operation of said connector.

3. In a dial telephone system, a connector having a plurality of different groups of connector terminals to be directly selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, means connecting each of said plurality of different frequency sources of ringing current to said first conductor in time sequence within recurring ringing cycles, a second conductor, means connecting each of said plurality of different frequency sources of ringing current to said second conductor in time sequence within recurring ringing cycles, the connection of said frequency sources to said second conductor in a given recurring ringing cycle being differently timed with respect to the connection of said frequency sources to said first conductor in the same recurring ringing cycle to provide a time interval between the connection of similar frequency sources to said conductors equal to at least the minimum interval between ringing current applications to a called line in a given ringing cycle, and means including one of the directively selected terminals of said connector for first connecting and disconnecting said first conductor and thereafter for connecting and disconnecting said second conductor to one of the directively selected talking conductor terminals in timed relation coincident with the connection of a predetermined one of said frequency sources to said first and second conductors whereby the frequency of ringing current is selectively determined and applied twice in a given ringing cycle to a party line in response to the directive operation of said connector.

4. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a source of ringing current, means connecting said source of ringing current to said first conductor in time sequence within recurring ringing cycles, a second conductor, means connecting said source of ringing current to said second conductor in time sequence within recurring ringing cycles, the connection of said current source to said second conductor in a given recurring ringing cycle being differently timed with respect to the connection of said current source to said first conductor in the same recurring ringing cycle to provide a time interval between the connections of the current source to said conductors equal to at least the minimum interval between ringing current applications to a called line in a given ringing cycle, and means including one of the directively selected terminals of said connector for predetermining the connection of said first and second conductors to one of the directively selected talking conductor terminals in timed relation coincident with the connection of said current source to said first and second conductors whereby either one or two applications of ringing current in a given ringing cycle to a party line may be selectively determined by the directive operation of said connector.

5. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, a rotatable cam shaft, means to rotate said shaft, cam operated switch means including cams on said shaft for connecting each of said plurality of different frequency sources of ringing current to said first conductor in time sequence within recurring ringing cycles, a second conductor, cam operated switch means including other cams on said shaft for connecting each of said plurality of different frequency sources of ringing current to said second conductor in time sequence within recurring ringing cycles, the said cams on said shaft being so related to each other that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, and means including one of the directively selected terminals of said connector for predetermining the connection of said first and second conductors to one of the directively selected talking conductor terminals in timed relation coincident with the connection of a predetermined one of said frequency sources to said first and second conductors whereby the frequency of ringing current and number of applications of ringing current in a given ringing cycle to a party line may be selectively determined by the directive operation of said connector.

6. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, a rotatable cam shaft, means to rotate said shaft, cam operated switch means including cams on said shaft for connecting each of said plurality of different frequency sources of ringing current to said first conductor in time sequence within recurring ringing cycles, a second conductor, cam operated switch means including other cams on said shaft for connecting each of said plurality of different frequency sources of ringing current to said second conductor in time sequence within recurring ringing cycles, the said cams on said shaft being so related to each other that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, and means including one of the directively selected terminals of said connector for first connecting and disconnecting said first conductor and thereafter for connecting and disconnecting said second conductor to one of the directively selected talking conductor terminals in timed relation coincident with the connection of a predetermined one of said frequency sources to said first and second conductors whereby the frequency of ringing current is selectively determined and applied twice in a given ringing cycle to a party line in response to the directive operation of said connector.

7. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a source of ringing current, a rotatable cam shaft, means to rotate said shaft, cam operated switch means including a cam on said shaft for connecting said source of ringing current to said first conductor in time sequence within recurring ringing cycles, a second conductor, cam operated switch means including another cam on said shaft for connecting said source of ringing current to said second conductor in time sequence within recurring ringing cycles, the said cams on said shaft being so related to each other that the connection of said current source to said second conductor in a given recurring ringing cycle is differently timed with respect to the connection of said current source to said first conductor in the same recurring ringing cycle to provide a time interval between the connections of the current source to said conductors equal to at least the minimum code interval between ringing current applications to a called line in a given ringing cycle, and means including one of the directively selected terminals of said connector for predetermining the connection of said first and second conductors to one of the directively selected talking conductor terminals in timed relation coincident with the connection of said current source to said first and second conductors whereby either one or two applications of ringing current in a given ringing cycle to a party line may be selectively determined by the directive operation of said connector.

8. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, a rotatable cam shaft, means to rotate said shaft, cam operated switch means including cams on said shaft for connecting each of said plurality of different frequency sources of ringing current to said first conductor in time sequence within recurring ringing cycles, a second conductor, cam operated switch means including other cams on said shaft for connecting each of said plurality of different frequency sources of ringing current to said second conductor in time sequence within recurring ringing cycles, the said cams on said shaft being so related to each other that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, and means including the directively selected hunt sleeve terminal of said connector for predetermining the connection of said first and second conductors to one of the directively selected tip and ring terminals in timed relation coincident with the connection of a predetermined one of said frequency sources to said first and second conductors whereby the frequency of ringing current and number of applications of ringing current in a given ringing cycle to a party line may be selectively determined by the directive operation of said connector.

9. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, means for connecting each of said plurality of different frequency sources of ringing current to said first conductor in time sequence within recurring ringing cycles, a second conductor, means for connecting each of said plurality of different frequency sources of ringing current to said second conductor in time sequence within recurring ringing cycles, the connection of said frequency sources to said second conductor in a given recurring ringing cycle being differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, and means including the directively selected hunt sleeve terminal of said connector for predetermining the connection of said first and second conductors to one of the directively selected tip and ring terminals in timed relation coincident with the connection of a predetermined one of said frequency sources to said first and second conductors whereby the frequency of ringing current and number of applications of ringing current in a given ringing cycle to a party line may be selectively determined by the directive operation of said connector.

10. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, means for connecting each of said plurality of different frequency sources of ringing current to said first conductor in time sequence within recurring ringing cycles, a second conductor, means for connecting each of said plurality of different frequency sources of ringing current to said second conductor in time sequence within recurring ringing cycles, the connection of said frequency sources to said second conductor in a given recurring ringing cycle being differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, and means including the directively selected hunt sleeve terminal of said connector for first connecting and disconnecting said first conductor and thereafter for connecting and disconnecting said second conductor to one of the directively selected tip and ring terminals in timed relation coincident with the connection of a predetermined one of said frequency sources to said first and second conductors whereby the frequency of ringing current is selectively determined and applied twice in a given ringing cycle to a party line in response to the directive operation of said connector.

11. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a source of ringing current, means for connecting said source of ringing current to said first conductor in time sequence within recurring ringing cycles, a second conductor, means for connecting said source of ringing current to said second conductor in time sequence within recurring ringing cycles, the connection of said current source to said second conductor in a given recurring ringing cycle being differently timed with respect to the connection of said current source to said first conductor in the same recurring ringing cycle to provide a time interval between the connections of the current source to said conductors equal to at least the minimum code interval between ringing current applications to a called line in a given ringing cycle, and means including the directively selected hunt sleeve terminal of said connector for predetermining the connection of said first and second conductors to one of the directively selected tip and ring terminals in timed relation coincident with the connection of said current source to said first and second conductors whereby either one or two applications of ringing current in a given ringing cycle to a party line may be selectively determined by the directive operation of said connector.

12. In a dial telephone system, a connector having a plurality of different groups of connector terminals to be directly selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in time sequence within recurring ringing cycles, a second conductor, a second plurality of cam operated switch means including other cams on said shaft for connecting each of said plurality of different frequency sources of ringing current to said second conductor in time sequence within recurring ringing cycles, the said cams on said shaft being so related to each other and the first and second cam switch means being so interconnected that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, a first ringing relay, a second ringing relay, first jumper means adapted to be connected to the directively selected hunt sleeve terminal of said connector and including a predetermined one of said first plurality of cam operated switch means for operating and releasing said first relay at a predetermined time during a ringing cycle of rotation of said cam shaft corresponding to the connection of a predetermined frequency of ringing current source to said first conductor, second jumper means adapted to be connected to the directively selected hunt sleeve terminal of said connector and including a predetermined one of said second plurality of cam operated switch means for intermittently operating and releasing said first relay at two predetermined times during a ringing cycle corresponding to connection of a predetermined frequency of ringing current source to said first and second conductors, only one of said first and second jumper means being connected to a given hunt sleeve terminal of said connector, means to operate said second relay in response to the operation and release of said first relay, third cam operated switch means to release said second relay at the end of a ringing cycle of rotation of said cam shaft, means to connect said first conductor to one of the directively selected tip and ring terminals of said connector through operated contacts of said first ringing relay, and means to connect said second conductor to one of the directively selected tip and ring terminals of said connector through operated contacts of both said first and second ringing relays whereby the frequency of ringing current and number of applications of ringing current in a given ringing cycle to a party line may be selectively determined by the directive operation of said connector and the connection of either said first or second jumper means to the hunt sleeve terminal of the connector.

13. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, a first plurality of switch means for connecting each of said plurality of different frequency sources of ringing current to said first conductor in time sequence within recurring ringing cycles, a second conductor, a second plurality of switch means for connecting each of said plurality of different frequency sources of ringing current to said second conductor in time sequence within recurring ringing cycles, the said first and second plurality of switch means being so interconnected that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, a first ringing relay, a second ringing relay, first jumper means adapted to be connected to the directively selected hunt sleeve terminal of said connector and including a predetermined one of said first plurality of switch means for operating and releasing said first relay at a predetermined time during a ringing cycle corresponding to the connection of a predetermined frequency of ringing current sources to said first conductor, second jumper means adapted to be connected to the directively selected hunt sleeve terminal of said connector and including a predetermined one of said second plurality of switch means for intermittently operating and releasing said first relay at two predetermined times during a ringing cycle corresponding to connection of a predetermined frequency of ringing current source to said first and second conductors, only one of said first and second jumper means being connected to a given hunt sleeve terminal of said connector, means to operate said second relay in response to the operation and release of said first relay, third switch means adapted to release said second relay at the end of a ringing cycle, means to connect said first conductor to one of the directively selected tip and ring terminals of said connector through operated contacts of said first ringing relay, and means to connect said second conductor to one of the directively selected tip and ring terminals of said connector through operated contacts of both said first and second ringing relays whereby the frequency of ringing current and number of applications of ringing current in a given ringing cycle to a party line may be selectively determined by the directive operation of said connector and the connection of either said first or second means to the hunt sleeve terminal of the connector.

14. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in time sequence within recurring ringing cycles, a second conductor, a second plurality of cam operated switch means including other cams on said shaft for connecting each of said plurality of different frequency sources of ringing current to said second conductor in time sequence within recurring ringing cycles, the said cams on said shaft being so related to each other and the first and second cam switch means being so interconnected that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, a first ringing relay, a second ringing relay, first jumper means adapted to be connected to a directively selected terminal of said connector and including a predetermined one of said first plurality of cam operated switch means for operating and releasing said first relay at a predetermined time during a ringing cycle of rotation of said cam shaft corresponding to the connection of a predetermined frequency of ringing current source to said first conductor, second jumper means adapted to be connected to a directively selected terminal of said connector and including a predetermined one of said second plurality of cam operated switch means for intermittently operating and releasing said first relay at two predetermined times during a ringing cycle corresponding to connection of a predetermined frequency of ringing current source to said first and second conductors, only one of said first and second jumper means being connected to a given directively selected terminal of said connector, means to operate said second relay in response to the operation and release of said first relay, third cam operated switch means to release said second relay at the end of a ringing cycle of rotation of said cam shaft, means to connect said first conductor to one of the directively selected talking conductor terminals of said connector through operated contacts of said first ringing relay, and means to connect said second conductor to one of the directively selected talking conductor terminals of said connector through operated contacts of both said first and second ringing relays whereby the frequency of ringing current and number of applications of ringing current in a given ringing cycle to a party line may be selectively determined by the directive operation of said connector and the connection of either said first or second jumper means to the hunt sleeve terminal of the connector.

15. In a dial telephone system, a connector having a plurality of different groups of connector terminals to be directively selected in response to the impulses of first and second digits, each of said groups of terminals including a pair of talking conductor terminals, means to connect the talking conductor terminals of a plurality of different groups of connector terminals in parallel to a party line, a first conductor, a plurality of different frequency sources of ringing current, a first plurality of switch means for connecting each of said plurality of different frequency sources of ringing current to said first conductor in time sequence within recurring ringing cycles, a second conductor, a second plurality of switch means for connecting each of said plurality of different frequency sources of ringing current to said second conductor in time sequence within recurring ringing cycles, the said first and second switch means being so interconnected that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications to a called line in a given ringing cycle, a first ringing relay, a second ringing relay, first jumper means adapted to be connected to a directively selected terminal of said connector and including a predetermined one of said first plurality of switch means for operating and releasing said first relay at a predetermined time during a ringing cycle corresponding to the connection of a predetermined frequency of ringing current source to said first conductor, second jumper means adapted to be connected to a directively selected terminal of said connector and including a predetermined one of said second plurality of switch means for intermittently operating and releasing said first relay at two predetermined times during a ringing cycle corresponding to connection of a predetermined frequency of ringing current source to said first and second conductors, only one of said first and second jumper means being connected to a given directively selected terminal of said connector, means to operate said second relay in response to the operation and release of said first relay, third switch means adapted to release said second relay at the end of a ringing cycle, means to connect said first conductor to one of the directively selected talking conductor terminals of said connector through operated contacts of said first ringing relay, and means to connect said second conductor to one of the directively selected talking conductor terminals of said connector through operated contacts of both said first and second ringing relays whereby the frequency of ringing current and number of applications of ringing current in a given ringing cycle to a party line may be selectively determined by the directive operation of said connector and the connection of either said first or second jumper means to the hunt sleeve terminal of the connector.

16. In a dial telephone system, a connector having a plurality of different groups of connector terminals to be directively selected in response to dial impulses, each of said groups of terminals including at least one talking conductor terminal, means to connect the talking conductor terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in time sequence within recurring ringing cycles, a second conductor, a second plurality of cam operated switch means including other cams on said shaft for connecting each of said plurality of different frequency sources of ringing current to said second conductor in time sequence within recurring ringing cycles, the said cams on said shaft being so related to each other and the first and second cam switch means being so interconnected that the connection of said frequency sources to said second conductor in a given recurring ringing cycle is differently timed with respect to the connection of said frequency sources to said first conductor in the same recurring ringing cycle to provide a time interval between the connection of similar frequency sources to said conductors equal to at least the minimum code interval between ringing current applications, to a called line in a given ringing cycle, a first ringing relay, a second ringing relay, first jumper means adapted to be connected to a directively selected terminal of said connector and including a predetermined one of said first plurality of cam operated switch means for operating and releasing said first relay at a predetermined time during a ringing cycle of rotation of said cam shaft corresponding to the connection of a predetermined frequency of ringing current source to said first conductor, second jumper means adapted to be connected to a directively selected terminal of said connector and including a predetermined one of said second plurality of cam operated switch means for intermittently operating and releasing said first relay at two predetermined times during a ringing cycle corresponding to connection of a predetermined frequency of ringing current source to said first and second conductors, only one of said first and second jumper means being connected to a given group of selected connector terminals, means to operate said second relay in response to the operation and release of said first relay, third cam operated switch means to release said second relay at the end of a ringing cycle of rotation of said cam shaft, means to connect said first conductor to the directively selected talking conductor terminal of said connector through operated contacts of said first ringing relay, and means to connect said second conductor to the directively selected talking conductor terminal of said connector through operated contacts of both said first and second ringing relays whereby the frequency of ringing current and number of applications of ringing current in a given ringing cycle to a party line may be selectively determined by the directive operation of said connector and the connection of either said first or second jumper means to the group of selected terminals of the connector.

GEORGE ELLIOTT.

No references cited.